United States Patent
Huh et al.

(10) Patent No.: US 11,927,731 B2
(45) Date of Patent: Mar. 12, 2024

(54) LENS AND OPTICAL IMAGING SYSTEM

(71) Applicant: Samsung Electro-Mechanics Co., Ltd., Suwon-si (KR)

(72) Inventors: Jae Hyuk Huh, Suwon-si (KR); Yong Joo Jo, Suwon-si (KR); Young Suk Kang, Suwon-si (KR); Phil Ho Jung, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 384 days.

(21) Appl. No.: 17/213,762

(22) Filed: Mar. 26, 2021

(65) Prior Publication Data
US 2022/0206274 A1    Jun. 30, 2022

(30) Foreign Application Priority Data
Dec. 28, 2020    (KR) .................... 10-2020-0184433

(51) Int. Cl.
*G02B 13/08*    (2006.01)
*G02B 9/60*    (2006.01)
*G02B 13/00*    (2006.01)

(52) U.S. Cl.
CPC .............. *G02B 13/08* (2013.01); *G02B 9/60* (2013.01); *G02B 13/0045* (2013.01)

(58) Field of Classification Search
None
See application file for complete search history.

(56) References Cited

U.S. PATENT DOCUMENTS

| | | | |
|---|---|---|---|
| 5,087,983 A * | 2/1992 | Takahashi | G02B 27/0031 359/205.1 |
| 5,282,088 A * | 1/1994 | Davidson | G02B 3/00 385/35 |
| 6,288,849 B1 * | 9/2001 | Teramoto | G02B 3/02 359/720 |
| 6,724,544 B2 * | 4/2004 | Kishima | G11B 7/1381 359/719 |
| 7,085,066 B2 * | 8/2006 | Neil | G02B 13/08 359/710 |
| 7,397,620 B2 * | 7/2008 | Hayashide | G02B 13/08 359/896 |
| 7,940,469 B2 * | 5/2011 | Kamei | G02B 13/08 359/671 |

(Continued)

FOREIGN PATENT DOCUMENTS

| | | |
|---|---|---|
| JP | 2007-328030 A | 12/2007 |
| KR | 10-2007-0083593 A | 8/2007 |

(Continued)

OTHER PUBLICATIONS

Taiwanese Office Action dated Jan. 27, 2022, in counterpart Taiwanese Patent Application No. 110112507 (6 pages in English and 7 pages in Mandarin).

(Continued)

*Primary Examiner* — Darryl J Collins
(74) *Attorney, Agent, or Firm* — NSIP Law

(57) ABSTRACT

A lens, wherein a first profile in a first direction intersecting an optical axis and a second profile in a second direction intersecting the optical axis are different from each other, and a length of the first profile in the first direction is different from a length of the second profile in the second direction.

15 Claims, 8 Drawing Sheets

(56) References Cited

U.S. PATENT DOCUMENTS

| | | | |
|---|---|---|---|
| 8,009,366 B2* | 8/2011 | Hirose | G02B 13/04 |
| | | | 359/671 |
| 2010/0060992 A1 | 3/2010 | Hirose | |
| 2017/0212334 A1 | 7/2017 | Imaoka | |
| 2021/0011260 A1* | 1/2021 | Dai | G02B 9/62 |

FOREIGN PATENT DOCUMENTS

| | | |
|---|---|---|
| WO | WO 2006/026317 A2 | 3/2006 |
| WO | WO 2013/065391 A1 | 5/2013 |

OTHER PUBLICATIONS

Korean Office Action dated Aug. 30, 2022, in counterpart Korean Patent Application No. 10-2020-0184433 (4 Pages in Korean, 5 Pages in English).

Korean Office Action dated Nov. 6, 2023, in counterpart Korean Patent Application No. 10-2023-0056387 (6 pages in English, 5 pages in Korean).

* cited by examiner

LENS AND OPTICAL IMAGING SYSTEM

CROSS-REFERENCE TO RELATED APPLICATIONS

This application claims the benefit under 35 USC 119(a) of Korean Patent Application No. 10-2020-0184433 filed on Dec. 28, 2020, in the Korean Intellectual Property Office, the entire disclosure of which is incorporated herein by reference for all purposes.

BACKGROUND

1. Field

The present disclosure relates to a lens configured to improve resolution deterioration and an optical imaging system including the same.

2. Description of the Background

A portable electronic device may generally include a camera module. For example, portable electronic devices such as smartphones and notebook computers include camera modules. An optical imaging system of the camera module may include a plurality of lenses to improve resolution of the camera module. For example, the optical imaging system includes three or more lenses. The optical imaging system may include a lens enabling a thinner or smaller camera module. For example, the optical imaging system includes a lens in which X and Y directions are asymmetrical. However, the lens described above may have optical characteristics in the X direction and optical characteristics in the Y direction that are different from initial design values due to an asymmetrical shape.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a lens, wherein a first profile in a first direction intersecting an optical axis and a second profile in a second direction intersecting the optical axis are different from each other, and a length of the first profile in the first direction is different from a length of the second profile in the second direction.

A radius of curvature Rx1 of an object-side surface of the first profile and a radius of curvature Ry1 of the object-side surface of the second profile may be different from each other.

|(Rx1−Ry1)/Ry1| may be greater than 0 and less than 0.5.

|(Rx1−Ry1)/Rx2| may be greater than 0.2 and less than 2.0 in which Rx2 is a radius of curvature of an image-side surface of the first profile.

|(fx−fy| may be greater than 0 and less than 0.5 mm in which fx is a focal length of the lens calculated based on a radius of curvature of the first profile, and fy is a focal length of the lens calculated based on a radius of curvature of the second profile.

|(fx−fy)/fx| may be greater than 0 and less than 0.01.

In another general aspect, an optical imaging system includes three or more lenses disposed on an optical axis, wherein one or more of the three or more lenses includes one or more anamorphic lenses each having at least one surface including a first profile including the optical axis different from a second profile including the optical axis, and a first length different from a length of the second profile.

The three or more lenses may include a first lens, a second lens, and a third lens disposed in sequential order from an object side, and the third lens may be an anamorphic lens of the one or more anamorphic lenses, the three or more lenses may include a first lens, a second lens, a third lens, and a fourth lens disposed in sequential order from an object side, and the second lens and the fourth lens may be anamorphic lenses of the one or more anamorphic lenses, or the three or more lenses may include a first lens, a second lens, a third lens, a fourth lens, and a fifth lens disposed in sequential order from an object side, and the fourth lens or the second lens and the fourth lens may be anamorphic lenses of the one or more anamorphic lenses.

When the second lens and the fourth lens may be anamorphic lenses, the first profile and the second profile may be on the object-side surfaces of the second lens and the fourth lens, and the first profile of the second lens may align with the second profile of the fourth lens when viewed in a direction of the optical axis, and the first profile may have a greater radius of curvature than the second profile of the second and fourth lenses.

The first lens may have positive refractive power, the second lens may have negative refractive power, and the third lens may have positive refractive power.

In another general aspect, an optical imaging system includes an anamorphic lens including a radius of curvature Rx1 of an object-side surface of a first profile including an optical axis, and a radius of curvature Ry1 of the object-side surface of a second profile including the optical axis, different from each other, wherein a length of the first profile and a length of the second profile are different from each other.

The optical imaging system may further include a first lens, a second lens, and a third lens sequentially arranged from an object side, wherein the third lens has positive refractive power and may be the anamorphic lens.

The optical imaging system may further include a first lens, a second lens, a third lens, and a fourth lens sequentially arranged from an object side, wherein the second lens and the fourth lens may be the anamorphic lens.

The optical imaging system may further include a first lens, a second lens, a third lens, a fourth lens, and a fifth lens sequentially arranged from an object side, wherein the second lens and the fourth lens may be the anamorphic lens.

The optical imaging system may further include a first lens, a second lens, a third lens, a fourth lens, and a fifth lens sequentially arranged from an object side, wherein the fourth lens may be the anamorphic lens.

(R10−R11$x$)/(R10−R11$y$) may be greater than 0.6 and less than 1.2 in which R10 is a radius of curvature of an image-side surface of the third lens, R11$x$ is a radius of curvature of an object-side surface according to a first profile of the fourth lens, and R11$y$ is a radius of curvature of an object-side surface according to a second profile of the fourth lens.

|(fx−fy)/f| may be greater than 0 and less than 0.005 in which fx is a focal length of the anamorphic lens calculated based on the radius of curvature of the first profile of the anamorphic lens, fy is a focal length of the anamorphic lens calculated based on the radius of curvature of the second profile of the anamorphic lens, and f is a focal length of the optical imaging system.

|(Rx1−Ry1)/Rx2| may be greater than 0 and less than 2.0 in which Rx2 is a radius of curvature of an image-side surface of the first profile of the anamorphic lens.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
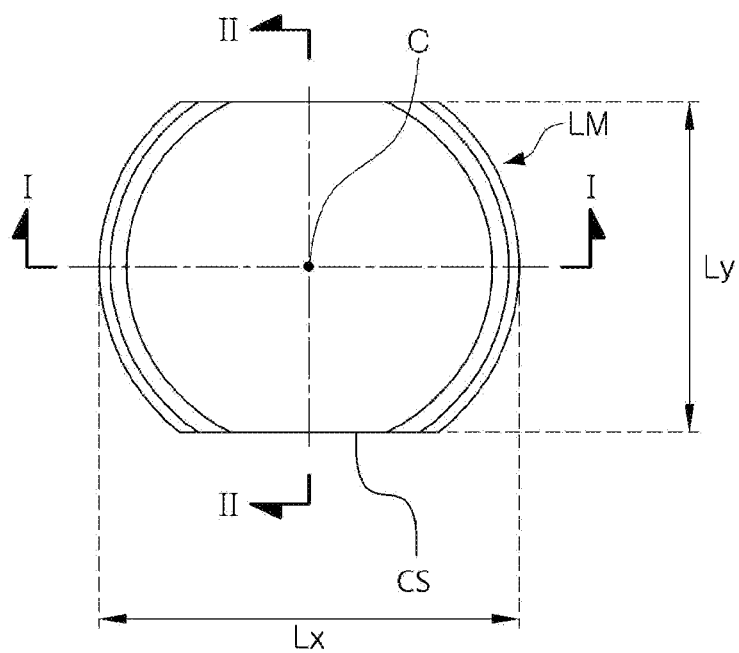
FIG. 1 is a plan view of a lens according to an example embodiment.

Hereinafter, while example embodiments of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of functions and constructions that would be well known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Herein, it is noted that use of the term "may" with respect to an example or embodiment, for example, as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein "portion" of an element may include the whole element or a part of the whole element less than the whole element.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," "lower," and the like may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of this disclosure. Further, although the examples described herein have a variety of configurations, other configurations are possible as will be apparent after an understanding of this disclosure.

In addition, in the present specification, a first lens means a lens closest to an object (or subject). In addition, all of radii of curvature and thicknesses of lenses, a distance along the optical axis from the object-side surface of the first lens to the imaging plane (TTL), a half of a diagonal length of an imaging plane (IMG HT), and focal lengths of the lenses are represented by millimeters (mm). Further, thicknesses of the lenses, gaps between the lenses, and the TTL are distances in optical axes of the lenses. Further, in a description for shapes of the lenses, the meaning that one surface of a lens is convex is that an optical axis portion of a corresponding surface is convex, and the meaning that one surface of a lens is concave is that an optical axis portion of a corresponding surface is concave. Therefore, although it is described that one surface of a lens is convex, an edge portion of the lens may be concave. Likewise, although it is described that one surface of a lens is concave, an edge portion of the lens may be convex. In the present specification, the imaging plane may mean an image forming surface on which a lens is focused or one surface of an image sensor.

An aspect of the present disclosure may provide a lens configured to significantly reduce resolution deterioration due to an asymmetrical shape and an optical imaging system including the same.

A lens LM according to an example embodiment in the present disclosure will be described with reference to FIGS. 1, 2A, and 2B.

The lens LM according to an example embodiment may be configured such that a first profile LMs1 in a first direction intersecting an optical axis C and a second profile LMs2 in a second direction intersecting the optical axis are different from each other. For example, a radius of curvature Rx1 of an object-side surface of the first profile LMs1 and a radius of curvature Ry1 of an object-side surface of the second profile LMs2 may be different. However, the lens LM is not necessarily limited to having different radii of curvature. For example, a radius of curvature Rx2 of an image-side surface of the first profile LMs1 and a radius of curvature Ry2 of an image-side surface of the second profile LMs2 may be the same. The lens LM according to an example embodiment may be configured to be installed in a narrow space. For example, a length Lx of the first profile LMs1 of the lens LM and a length Ly of the second profile LMs2 may be different. For reference, the lengths Lx and Ly of the profiles LMs1 and LMs2 mean a size in a direction intersecting the optical axis as illustrated in FIGS. 1, 2A, and 2B.

The lens LM according to an example embodiment may be formed of a plastic material. However, a material of the lens LM is not limited to the plastic. The lens LM may be configured to facilitate mass production. For example, the lens LM may be manufactured by injection molding.

The lens LM according to an example embodiment may satisfy one or more of the following Conditional Expressions:

$$0 < |(Rx1-Ry1)/Ry1| < 0.5$$

$$0.2 < |(Rx1-Ry1)/Rx2| < 2.0$$

$$0 < |fx-fy| < 0.5 \text{ mm}$$

$$0 < |(fx-fy)/fx| < 0.01$$

In the above Conditional Expressions, Rx1 is a radius of curvature of an object-side surface of the first profile LMs1, Rx2 is a radius of curvature of an image-side surface of the first profile LMs1, Ry1 is a radius of curvature of an object-side surface of the second profile LMs2, fx is a focal length calculated based on the radius of curvature of the first profile LMs1, and fy is a focal length calculated based on the radius of curvature of the second profile LMs2.

The lens LM may include a cut surface CS. For example, the cut surfaces CS may be formed on both sides of the lens LM. However, both sides of the lens LM are not necessarily limited to being formed as the cut surface CS. For example, only one side of the lens LM may be formed as the cut surface. The cut surface CS may be configured so that incidence of light does not occur. For example, the cut surface CS may be formed substantially parallel to the optical axis. The cut surface CS may be configured so that reflection of light does not occur. For example, an antireflection layer may be formed on the cut surface CS.

The lens LM configured as described above may reduce a resolution deterioration phenomenon that inevitably occurs during injection molding. For example, the lens LM according to an example embodiment may reduce a difference in refractive power and resolution of light generated in a gate direction or in a direction perpendicular to the gate.

Next, an optical imaging system according to an example embodiment in the present disclosure will be described.

An optical imaging system according to an example embodiment of the present disclosure may be mounted on a camera module for a portable terminal. However, the application range of the optical imaging system is not limited to the camera module for a portable terminal. Further, the optical imaging system may be selectively applied to a plurality of camera modules. As an example, the optical imaging system may be applied only to any one of two or more camera modules mounted on the portable terminal. As another example, the optical imaging system may be applied to one or more of three or more camera modules mounted on the portable terminal.

The optical imaging system according to an example embodiment may adjust aberration of light rays reaching an imaging plane. For example, the optical imaging system may adjust the aberration of light rays through a non-rotationally symmetric anamorphic lens. The anamorphic lens may be configured such that a radius of curvature of a first profile including an optical axis and a radius of curvature of a second profile including the optical axis are different. For example, in the anamorphic lens, a radius of curvature of an object-side surface of a first profile including an optical axis and a radius of curvature of an object-side surface of a second profile including the optical axis may be different. The anamorphic lens may be configured such that a length of the first profile and a length of the second profile are different. For example, the length of the first profile may be greater than the length of the second profile.

The optical imaging system may include a plurality of lenses. For example, the optical imaging system may include a first lens, a second lens, and a third lens sequentially arranged from an object side. One of the first to third lenses may be an anamorphic lens. For example, the third lens may be an anamorphic lens having positive refractive power. However, the number of lenses configuring the optical imaging system is not limited to three. As an example, the optical imaging system may further include a fourth lens arranged on an image side of the third lens. As another example, the optical imaging system may further include a fourth lens and a fifth lens sequentially arranged on the image side of the third lens. The optical imaging system may include the anamorphic lens described above. As an example, at least one of the third to fourth lenses may be configured as the anamorphic lens. The optical imaging system may include a plurality of anamorphic lenses. For example, the second lens and the fourth lens may be configured as the anamorphic lenses.

The optical imaging system may include a lens (hereinafter, referred to as a cut lens) whose one side surface is cut. For example, one or more of the first to third lenses, the first to fourth lenses, or the first to fifth lenses constituting the optical imaging system may be a cut lens. The cut surface of the cut lens may be connected to the object-side surface and the image-side surface. The cut surface may be configured so that incidence of light does not occur thereto. For example, the cut surface may be formed substantially parallel to the optical axis. The cut surface may be configured so that reflection of light does not occur. For example, an antireflection layer may be formed on the cut surface.

The optical imaging system may further include an optical path folding element. For example, the optical imaging system may further include a prism disposed on an object side of the first lens.

Next, features of the lenses constituting the optical imaging system according to an example embodiment will be described.

The first lens may have refractive power. For example, the first lens may have positive refractive power. The first lens may have an aspherical surface. For example, both surfaces of the first lens may be aspherical. The first lens may have a predetermined refractive index. For example, the refractive index of the first lens may be 1.5 or more and less than 1.56.

The second lens may have refractive power. For example, the second lens may have negative refractive power. The second lens may have an aspherical surface. For example, both surfaces of the second lens may be aspherical. The second lens may have a predetermined refractive index. For example, the refractive index of the second lens may be 1.60 or more and less than 1.66.

The third lens may have refractive power. For example, the third lens may have positive refractive power. The third lens may have an aspherical surface. For example, both surfaces of the third lens may be aspherical. The third lens may have a predetermined refractive index. For example, the refractive index of the third lens may be 1.62 or more and less than 1.7.

The fourth lens may have refractive power. For example, the fourth lens may have negative refractive power. The fourth lens may have an aspherical surface. For example, both surfaces of the fourth lens may be aspherical. The fourth lens may have a predetermined refractive index. For example, the refractive index of the fourth lens may be 1.60 or more and less than 1.66.

The fifth lens may have refractive power. For example, the fifth lens may have positive refractive power. The fifth lens may have an aspherical surface. For example, both surfaces of the fifth lens may be aspherical. The fifth lens may have a predetermined refractive index. For example, the refractive index of the fifth lens may be 1.5 or more and less than 1.56.

The first to fifth lenses may have the aspherical shape, as described above. An aspherical surface of each of the lenses may be represented by the following Equation 1:

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20} \qquad \text{Equation 1}$$

Here, c is an inverse of a radius of curvature of the lens, k is a conic constant, r is a distance from a certain point on an aspherical surface of the lens to an optical axis, A to H, and J are aspherical constants, and Z (or SAG) is a distance between the certain point on the aspherical surface of the lens at the distance r and a tangential plane meeting the apex of the aspherical surface of the lens.

The optical imaging system may further include other elements in addition to the first to fifth lenses. The optical imaging system may further include a filter, a stop, and an image sensor having an imaging surface disposed at the imaging plane of the optical imaging system.

The filter may be disposed between the lens disposed closest to the imaging plane and the image sensor. The filter may block a partial wavelength from incident light to improve resolution of the optical imaging system. For example, the filter may block an infrared wavelength of the incident light. The aperture may be disposed on an object side of the foremost lens (disposed closest to the object side, also known as the first lens) or between any two adjacent lenses of the first to fifth lenses, or between the fifth lens and the imaging plane. The optical imaging system may include two or more stops disposed at different locations. The imaging plane may be disposed at a focal position of the optical imaging system. The image sensor may convert an image of an object formed on an effective imaging area of the imaging surface by the lenses of the optical imaging system into an electrical signal.

The optical imaging system may satisfy one or more of the following Conditional Expressions:

$0 < |(Rx1-Ry1)/Ry1| < 0.5$ $0.2 < |(Rx1-Ry1)/Rx2| < 2.0$ $0 < |fx-fy| < 0.5$ mm $0 < |(fx-fy)/fx| < 0.01$ $0 < |(fx-fy)/f| < 0.005$ $0 < |(Rx1-Ry1)/Rx2| < 2.0$ $0.6 < (R10-R11x)/(R10-R11y) < 1.2$

In the above Conditional Expressions, Rx1 is a radius of curvature of an object-side surface of the first profile of the anamorphic lens, Ry1 is a radius of curvature of an object-side surface of the second profile of the anamorphic lens, Rx2 is a radius of curvature of an image-side surface of the first profile of the anamorphic lens, fx is a focal length calculated based on the radius of curvature of the first profile of the anamorphic lens, fy is a focal length calculated based on the radius of curvature of the second profile of the anamorphic lens, f is a focal length of the optical imaging system, R10 is a radius of curvature of an image-side surface of the third lens, R11x is a radius of curvature of an object-side surface according to a first profile of the fourth lens, and R11y is a radius of curvature of an object-side surface according to a second profile of the fourth lens.

Hereinafter, example embodiments in the present disclosure will be described in detail with reference to the accompanying drawings.

Figure 3:
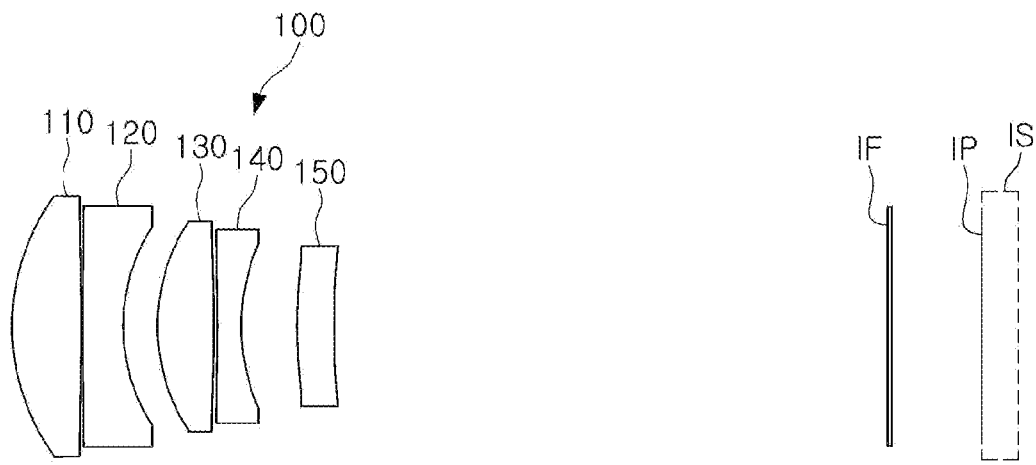
FIG. 3 is a view illustrating an optical imaging system according to a first example embodiment in the present disclosure.

An optical imaging system according to a first example embodiment will be described with reference to FIG. 3.

An optical imaging system 100 may include a first lens 110, a second lens 120, a third lens 130, a fourth lens 140, and a fifth lens 150.

The first lens 110 may have positive refractive power. An object-side surface of the first lens 110 may be convex, and an image-side surface thereof may be convex. The second lens 120 may have negative refractive power. An object-side surface of the second lens 120 may be convex, and an image-side surface thereof may be concave. The third lens 130 may have positive refractive power. An object-side surface of the third lens 130 may be convex, and an image-side surface thereof may be convex. The fourth lens 140 may have negative refractive power. An object-side surface of the fourth lens 140 may be concave, and an image-side surface thereof may be concave. The fifth lens 150 may have positive refractive power. An object-side surface of the fifth lens 150 may be convex, and an image-side surface thereof may be concave. Among the aforementioned lenses, the fourth lens 140 may be a non-rotational symmetric anamorphic lens.

The optical imaging system 100 may include a filter IF and an imaging plane IP. The filter IF may be disposed in front of the imaging plane IP to block infrared rays or the like included in the incident light. The imaging plane IP may be formed on an image sensor IS. For example, the imaging plane IP may be formed on one surface of the image sensor IS. However, the imaging plane IP is not necessarily formed on the image sensor IS. For example, the imaging plane IP may be formed on any type of member or device capable of converging optical signals, such as an image film.

The optical imaging system 100 may further include a prism (not shown) which is an optical path folding element. The prism may be disposed on an object side of the first lens 110.

Figure 2A:
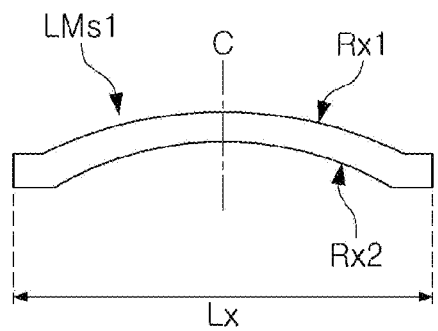
FIG. 2A is an example of a first profile of the lens illustrated in FIG. 1 in a first direction.
Figure 2B:
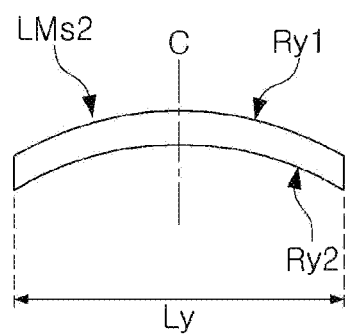
FIG. 2B is an example of a second profile of the lens illustrated in FIG. 1 in a second direction.

The optical imaging system 100 may include a lens having a shape illustrated in FIG. 1. For example, one or more of the first to fifth lenses 110 to 150 may have cut surfaces CS formed on both sides as illustrated in FIG. 1.

Figure 4:
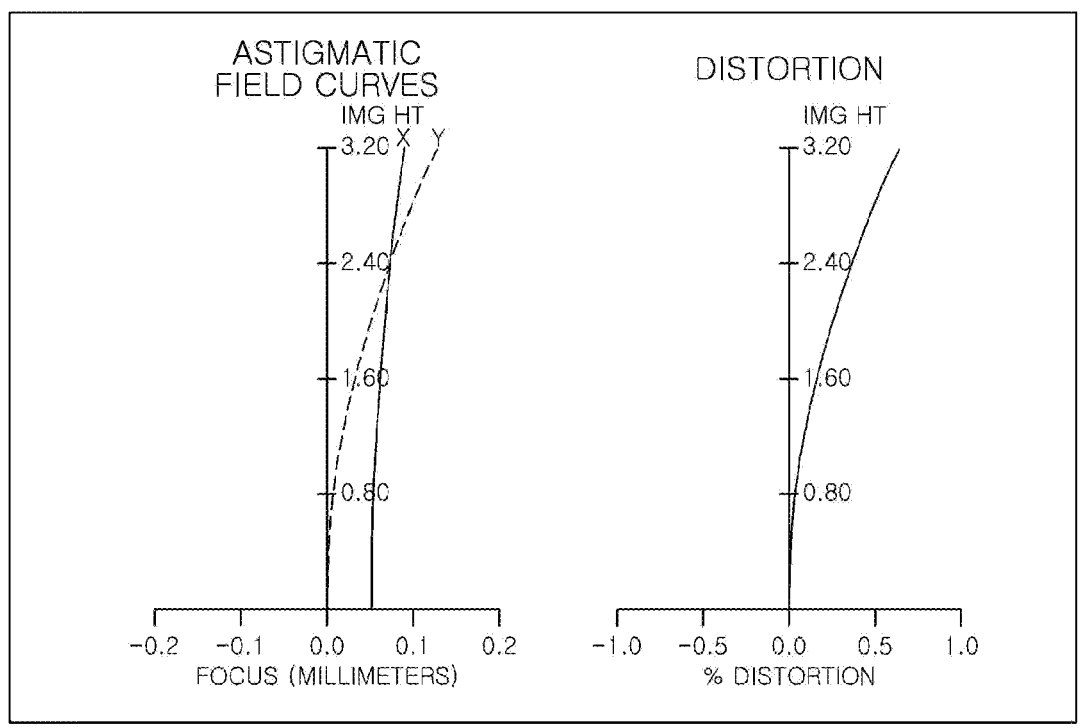
FIG. 4 presents graphs having curves representing aberration characteristics of the optical imaging system illustrated in FIG. 1.

Table 1 represents characteristics of lenses of the optical imaging system 100 according to the present example embodiment, and Table 2 represents aspherical values of the optical imaging system 100 according to the present example embodiment. FIG. 4 presents graphs having curves representing aberration characteristics of the optical imaging system 100 configured as described above.

TABLE 1

| Surface No. | Element | Radius of Curvature (Rx) | Radius of Curvature (Ry) | Thickness/ Distance | Refractive Index | Abbe Number | Effective Radius |
|---|---|---|---|---|---|---|---|
| 1 | Prism | Infinity | Infinity | 0.000 | | | 6.000 |
| 2 | | Infinity | Infinity | 5.500 | 1.723 | 29.5 | 6.000 |
| 3 | | Infinity | Infinity | 5.500 | 1.723 | 29.5 | 8.485 |
| 4 | | Infinity | Infinity | 3.000 | | | 6.000 |
| 5 | First Lens | 5.8252 | 5.8252 | 1.993 | 1.537 | 55.7 | 3.300 |
| 6 | | −70.7610 | −70.7610 | 0.035 | | | 3.095 |
| 7 | Second Lens | 249.3151 | 249.3151 | 1.106 | 1.644 | 23.5 | 3.058 |
| 8 | | 4.9733 | 4.9733 | 0.948 | | | 2.650 |
| 9 | Third Lens | 5.3624 | 5.3624 | 1.599 | 1.667 | 20.4 | 2.659 |
| 10 | | −39.0877 | −39.0877 | 0.074 | | | 2.480 |
| 11 | Fourth Lens | −100.7217 | −99.0000 | 0.682 | 1.644 | 23.5 | 2.438 |
| 12 | | 5.7443 | 5.7443 | 1.561 | | | 2.190 |
| 13 | Fifth Lens | 15.8152 | 15.8152 | 1.000 | 1.546 | 56.0 | 2.032 |
| 14 | | 16.9556 | 16.9556 | 15.391 | | | 1.940 |
| 15 | Filter | Infinity | Infinity | 0.110 | 1.519 | 64.2 | 3.024 |
| 16 | | Infinity | Infinity | 2.501 | | | 3.030 |
| 17 | Imaging Plane | Infinity | Infinity | 0.000 | | | 3.207 |

TABLE 2

| | Surface No. | | | | | | |
|---|---|---|---|---|---|---|---|
| | 5 | 6 | 7 | 8 | 9 | 11 : Anamorphic | |
| K | −0.44733 | −7.83886 | 99.00000 | 0.15108 | 0.37211 | Y Conic Constant | 0.00000 |
| A | 0.00015 | 0.00011 | −0.00019 | −0.00054 | −0.00040 | 4-th Order Symmetry Coefficient | 0.00000 |
| B | 0.00001 | 0.00000 | 0.00001 | 0.00000 | 0.00001 | 6-th Order Symmetry Coefficient | 0.00000 |

TABLE 2-continued

| | | | | | | | |
|---|---|---|---|---|---|---|---|
| C | 0.00000 | 0.00000 | 0.00000 | 0.00000 | 0.00000 | 8-th Order Symmetry Coefficient | 0.00000 |
| D | 0.00000 | 0.00000 | 0.00000 | 0.00000 | 0.00000 | 10-th Order Symmetry Coefficient | 0.00000 |
| E | 0.00000 | 0.00000 | 0.00000 | 0.00000 | 0.00000 | X Conic Constant | 0.00000 |
| F | 0.00000 | 0.00000 | 0.00000 | 0.00000 | 0.00000 | 4-th Order Asymmetry Coefficient | 0.00000 |
| G | 0.00000 | 0.00000 | 0.00000 | 0.00000 | 0.00000 | 6-th Order Asymmetry Coefficient | 0.00000 |
| H | 0.00000 | 0.00000 | 0.00000 | 0.00000 | 0.00000 | 8-th Order Asymmetry Coefficient | 0.00000 |
| J | 0.00000 | 0.00000 | 0.00000 | 0.00000 | 0.00000 | 10-th Order Asymmetry Coefficient | 0.00000 |

| | Surface No. | | | |
|---|---|---|---|---|
| | 10 | 12 | 13 | 14 |
| K | −62.20732 | 0.42974 | −7.39730 | −24.78544 |
| A | 0.00001 | −0.00060 | −0.00157 | −0.00045 |
| B | 0.00007 | 0.00002 | −0.00002 | −0.00007 |
| C | 0.00000 | 0.00000 | −0.00001 | −0.00002 |
| D | 0.00000 | 0.00000 | 0.00000 | 0.00000 |
| E | 0.00000 | 0.00000 | 0.00000 | 0.00000 |
| F | 0.00000 | 0.00000 | 0.00000 | 0.00000 |
| G | 0.00000 | 0.00000 | 0.00000 | 0.00000 |
| H | 0.00000 | 0.00000 | 0.00000 | 0.00000 |
| J | 0.00000 | 0.00000 | 0.00000 | 0.0 |

Figure 5:
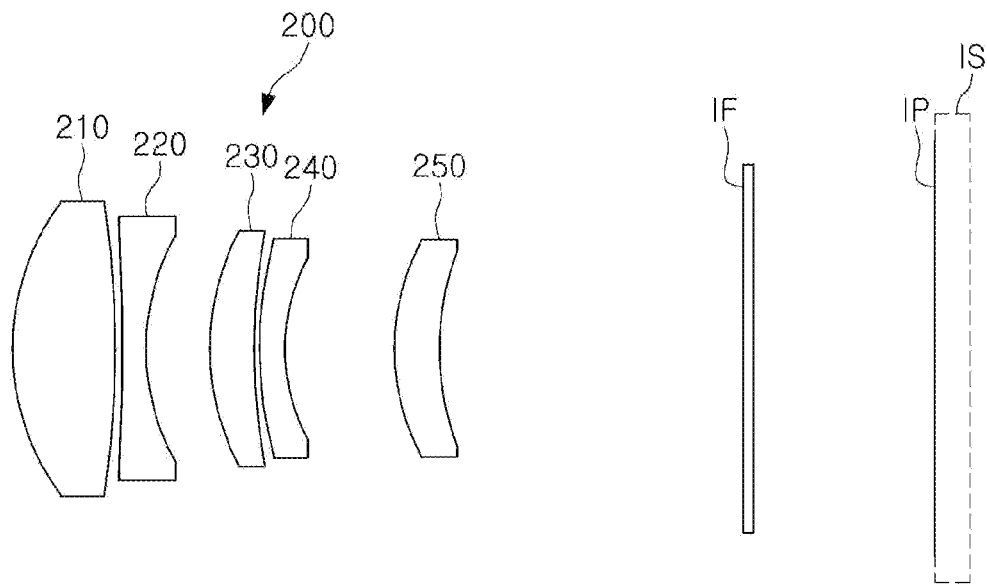
FIG. 5 is a view illustrating an optical imaging system according to a second example embodiment in the present disclosure.
Figure 6:
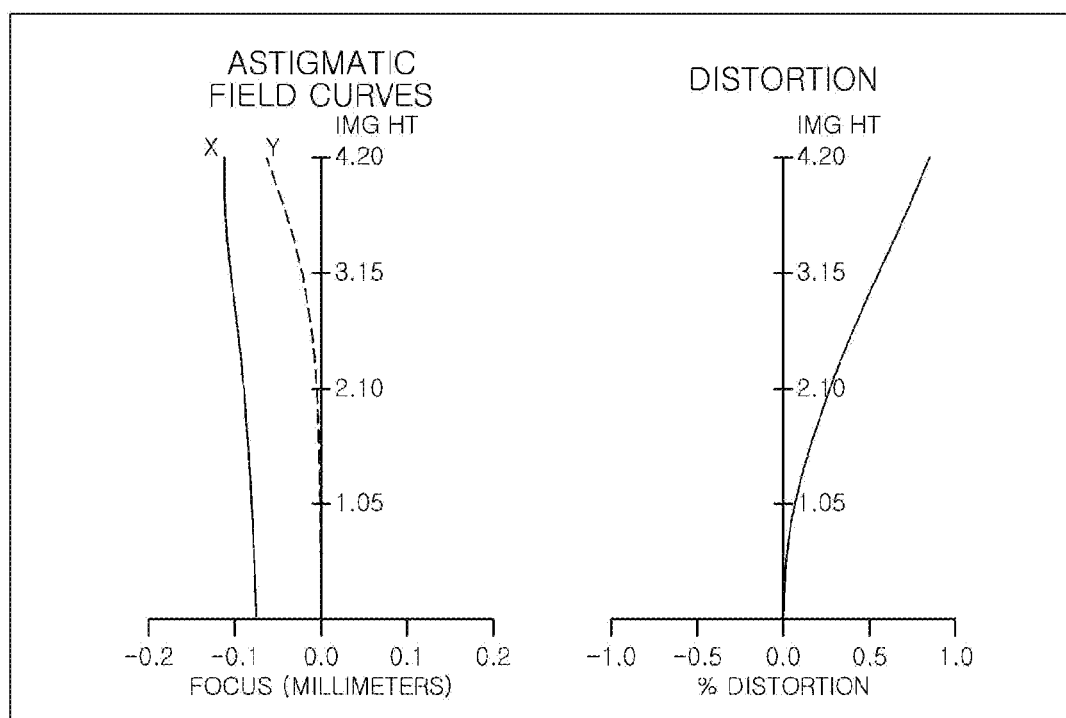
FIG. 6 presents graphs having curves representing aberration characteristics of the optical imaging system illustrated in FIG. 5.

An optical imaging system according to a second example embodiment will be described with reference to FIG. 5.

An optical imaging system 200 may include a first lens 210, a second lens 220, a third lens 230, a fourth lens 240, and a fifth lens 250.

The first lens 210 may have positive refractive power. An object-side surface of the first lens 210 may be convex, and an image-side surface thereof may be convex. The second lens 220 may have negative refractive power. An object-side surface of the second lens 220 may be concave, and an image-side surface thereof may be concave. The third lens 230 may have positive refractive power. An object-side surface of the third lens 230 may be convex, and an image-side surface thereof may be concave. The fourth lens 240 may have negative refractive power. An object-side surface of the fourth lens 240 may be convex, and an image-side surface thereof may be concave. The fifth lens 250 may have positive refractive power. An object-side surface of the fifth lens 250 may be convex, and an image-side surface thereof may be concave. Among the aforementioned lenses, the fourth lens 240 may be a non-rotational symmetric anamorphic lens.

The optical imaging system 200 may include a filter IF and an imaging plane IP. The filter IF may be disposed in front of the imaging plane IP to block infrared rays or the like included in the incident light. The imaging plane IP may be formed on an image sensor IS. For example, the imaging plane IP may be formed on one surface of the image sensor IS. However, the imaging plane IP is not necessarily formed on the image sensor IS. For example, the imaging plane IP may be formed on any type of member or device capable of converging optical signals, such as an image film.

The optical imaging system 200 may further include a prism (not shown) which is an optical path folding element. The prism may be disposed on an object side of the first lens 210.

The optical imaging system 200 may include a lens having a shape illustrated in FIG. 1. For example, one or more of the first to fifth lenses 210 to 250 may have cut surfaces CS formed on both sides as illustrated in FIG. 1.

Table 3 represents characteristics of lenses of the optical imaging system 200 according to the present example embodiment, and Table 4 represents aspherical values of the optical imaging system 200 according to the present example embodiment. FIG. 5 presents graphs having curves representing aberration characteristics of the optical imaging system 200 configured as described above.

TABLE 3

| Surface No. | Element | Radius of Curvature (Rx) | Radius of Curvature (Ry) | Thickness/ Distance | Refractive Index | Abbe Number | Effective Radius |
|---|---|---|---|---|---|---|---|
| 1 | Prism | Infinity | Infinity | 0.000 | | | 6.000 |
| 2 | | Infinity | Infinity | 5.500 | 1.723 | 29.5 | 6.000 |
| 3 | | Infinity | Infinity | 5.500 | 1.723 | 29.5 | 8.485 |
| 4 | | Infinity | Infinity | 3.000 | | | 6.000 |
| 5 | First Lens | 4.7421 | 4.7421 | 2.048 | 1.537 | 55.7 | 3.300 |
| 6 | | −17.6184 | −17.6184 | 0.120 | | | 3.095 |

TABLE 3-continued

| Surface No. | Element | Radius of Curvature (Rx) | Radius of Curvature (Ry) | Thickness/ Distance | Refractive Index | Abbe Number | Effective Radius |
|---|---|---|---|---|---|---|---|
| 7 | Second Lens | −95.8922 | −95.8922 | 0.500 | 1.621 | 26.0 | 3.058 |
| 8 | | 4.2715 | 4.2715 | 1.258 | | | 2.650 |
| 9 | Third Lens | 4.6379 | 4.6379 | 0.889 | 1.679 | 19.2 | 2.659 |
| 10 | | 9.3708 | 9.3708 | 0.100 | | | 2.480 |
| 11 | Fourth Lens | 6.9347 | 6.9000 | 0.500 | 1.621 | 26.0 | 2.438 |
| 12 | | 3.5656 | 3.5656 | 2.203 | | | 2.190 |
| 13 | Fifth Lens | 3.8576 | 3.8576 | 0.882 | 1.547 | 56.1 | 2.032 |
| 14 | | 4.7572 | 4.7572 | 6.068 | | | 1.940 |
| 15 | Filter | Infinity | Infinity | 0.210 | 1.519 | 64.2 | 3.024 |
| 16 | | Infinity | Infinity | 3.618 | | | 3.030 |
| 17 | Imaging Plane | Infinity | Infinity | 0.001 | | | 3.207 |

TABLE 4

| | Surface No. | | | | | 11 : Anamorphic | |
|---|---|---|---|---|---|---|---|
| | 5 | 6 | 7 | 8 | 9 | | |
| K | −0.70575 | −2.23459 | −58.45925 | −0.02889 | −0.00793 | Y Conic Constant | −0.03401 |
| A | 0.00024 | 0.00080 | −0.00139 | −0.00353 | −0.00288 | 4-th Order Symmetry Coefficient | −0.00295 |
| B | 0.00000 | −0.00001 | 0.00013 | −0.00001 | 0.00020 | 6-th Order Symmetry Coefficient | −0.00002 |
| C | 0.00000 | 0.00000 | 0.00000 | −0.00001 | −0.00001 | 8-th Order Symmetry Coefficient | 0.00004 |
| D | 0.00000 | 0.00000 | 0.00000 | 0.00000 | 0.00000 | 10-th Order Symmetry Coefficient | −0.00001 |
| E | 0.00000 | 0.00000 | 0.00000 | 0.00000 | 0.00000 | X Conic Constant | −0.03401 |
| F | 0.00000 | 0.00000 | 0.00000 | 0.00000 | 0.00000 | 4-th Order Asymmetry Coefficient | 0.00000 |
| G | 0.00000 | 0.00000 | 0.00000 | 0.00000 | 0.00000 | 6-th Order Asymmetry Coefficient | 0.00000 |
| H | 0.00000 | 0.00000 | 0.00000 | 0.00000 | 0.00000 | 8-th Order Asymmetry Coefficient | 0.00000 |
| J | 0.00000 | 0.00000 | 0.00000 | 0.00000 | 0.00000 | 10-th Order Asymmetry Coefficient | 0.00000 |

| | Surface No. | | | |
|---|---|---|---|---|
| | 10 | 12 | 13 | 14 |
| K | −1.67614 | −0.00939 | −0.84534 | −1.77094 |
| A | −0.00288 | −0.00540 | −0.00526 | −0.00291 |
| B | 0.00028 | 0.00030 | 0.00013 | −0.00012 |
| C | −0.00002 | 0.00009 | 0.00002 | 0.00003 |
| D | 0.00000 | 0.00001 | 0.00000 | 0.00001 |
| E | 0.00000 | −0.00001 | 0.00000 | 0.00000 |
| F | 0.00000 | 0.00000 | 0.00000 | 0.00000 |
| G | 0.00000 | 0.00000 | 0.00000 | 0.00000 |
| H | 0.00000 | 0.00000 | 0.00000 | 0.00000 |
| J | 0.00000 | 0.00000 | 0.00000 | 0.00000 |

Figure 7:
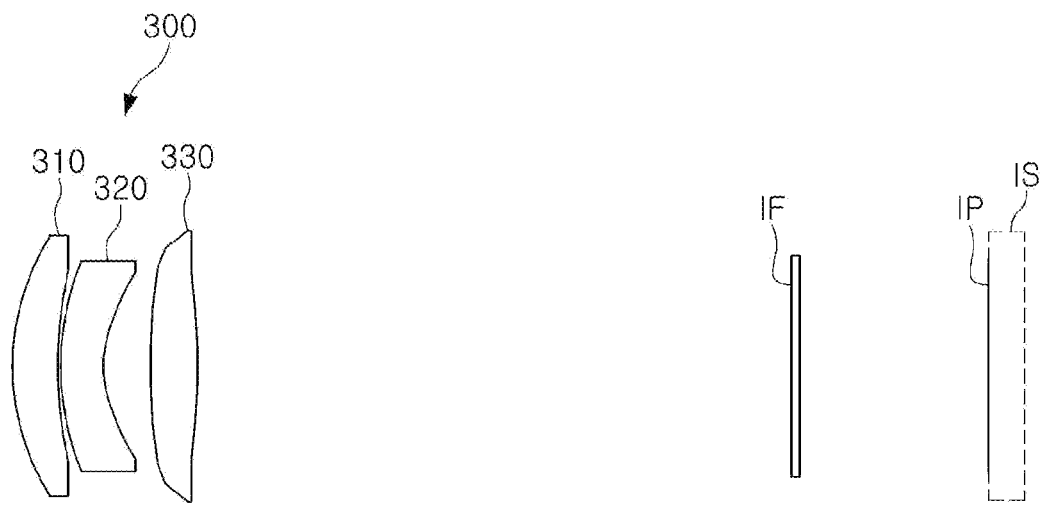
FIG. 7 is a view illustrating an optical imaging system according to a third example embodiment in the present disclosure.

An optical imaging system according to a third example embodiment will be described with reference to FIG. 7.

An optical imaging system 300 may include a first lens 310, a second lens 320, and a third lens 330.

The first lens 310 may have positive refractive power. An object-side surface of the first lens 310 may be convex, and an image-side surface thereof may be concave. The second lens 320 may have negative refractive power. An object-side surface of the second lens 320 may be convex, and an image-side surface thereof may be concave. The third lens 330 may have positive refractive power. An object-side surface of the third lens 330 may be convex, and an image-side surface thereof may be concave. Among the aforementioned lenses, the third lens 330 may be a non-rotational symmetric anamorphic lens.

The optical imaging system 300 may include a filter IF and an imaging plane IP. The filter IF may be disposed in front of the imaging plane IP to block infrared rays or the like included in the incident light. The imaging plane IP may be formed on an image sensor IS. For example, the imaging plane IP may be formed on one surface of the image sensor IS. However, the imaging plane IP is not necessarily formed on the image sensor IS. For example, the imaging plane IP may be formed on any type of member or device capable of converging optical signals, such as an image film.

The optical imaging system 300 may further include a prism (not shown) which is an optical path folding element. The prism may be disposed on an object side of the first lens 310.

The optical imaging system 300 may include a lens having a shape illustrated in FIG. 1. For example, one or more of the first to third lenses 310 to 330 may have cut surfaces CS formed on both sides as illustrated in FIG. 1.

Figure 8:
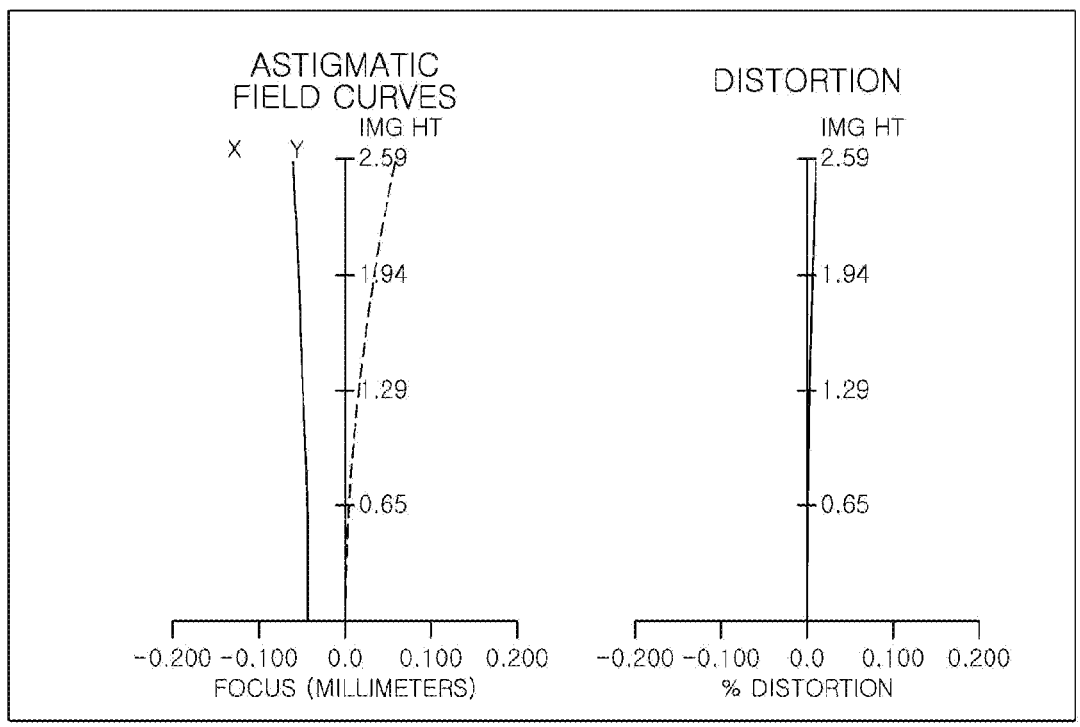
FIG. 8 presents graphs having curves representing aberration characteristics of the optical imaging system illustrated in FIG. 7.

Table 5 represents characteristics of lenses of the optical imaging system 300 according to the present example embodiment, and Table 6 represents aspherical values of the optical imaging system 300 according to the present example embodiment. FIG. 8 presents graphs having curves representing aberration characteristics of the optical imaging system 300 configured as described above.

TABLE 5

| Surface No. | Element | Radius of Curvature (Rx) | Radius of Curvature (Ry) | Thickness/ Distance | Refractive Index | Abbe Number | Effective Radius |
|---|---|---|---|---|---|---|---|
| 1 | Prism | Infinity | Infinity | 0.000 | | | 6.000 |
| 2 | | Infinity | Infinity | 5.500 | 1.723 | 29.5 | 6.000 |
| 3 | | Infinity | Infinity | 5.500 | 1.723 | 29.5 | 8.485 |
| 4 | | Infinity | Infinity | 3.000 | | | 6.000 |
| 5 | First Lens | 6.3172 | 6.3172 | 1.153 | 1.537 | 55.7 | 3.000 |
| 6 | | 15.7178 | 15.7178 | 0.056 | | | 2.422 |
| 7 | Second Lens | 5.7851 | 5.7851 | 1.094 | 1.620 | 25.9 | 2.426 |
| 8 | | 3.0580 | 3.0580 | 1.179 | | | 2.270 |
| 9 | Third Lens | 22.1360 | 22.0500 | 1.194 | 1.640 | 44.2 | 3.240 |
| 10 | | −16.3216 | −16.3216 | 15.000 | | | 2.427 |
| 11 | Filter | Infinity | Infinity | 0.210 | 1.519 | 64.2 | 2.547 |
| 12 | | Infinity | Infinity | 4.768 | | | 2.548 |
| 13 | Imaging Plane | Infinity | Infinity | 0.004 | | | 2.589 |

TABLE 6

| | Surface No. | | | | | | |
|---|---|---|---|---|---|---|---|
| | 5 | 6 | 7 | 8 | 10 | 9 : Anamorphic | |
| K | −1.32284 | −1.00000 | −1.54431 | −1.15945 | −1.00000 | Y Conic Constant | 0.69733 |
| A | 0.00082 | 0.00326 | −0.00168 | −0.00432 | 0.00012 | 4-th Order Symmetry Coefficient | 0.00086 |
| B | −0.00002 | −0.00046 | −0.00005 | 0.00031 | 0.00041 | 6-th Order Symmetry Coefficient | −0.00001 |
| C | 0.00000 | 0.00008 | 0.00000 | −0.00002 | −0.00028 | 8-th Order Symmetry Coefficient | −0.00001 |
| D | 0.00000 | −0.00001 | 0.00000 | 0.00000 | 0.00011 | 10-th Order Symmetry Coefficient | 0.00000 |
| E | 0.00000 | 0.00000 | 0.00000 | 0.00000 | −0.00002 | X Conic Constant | 0.79417 |
| F | 0.00000 | 0.00000 | 0.00000 | 0.00000 | 0.00000 | 4-th Order Asymmetry Coefficient | 0.00000 |
| G | 0.00000 | 0.00000 | 0.00000 | 0.00000 | 0.00000 | 6-th Order Asymmetry Coefficient | 0.00000 |
| H | 0.00000 | 0.00000 | 0.00000 | 0.00000 | 0.00000 | 8-th Order Asymmetry Coefficient | 0.00000 |
| J | 0.00000 | 0.00000 | 0.00000 | 0.00000 | 0.00000 | 10-th Order Asymmetry Coefficient | 0.00000 |

Figure 9:
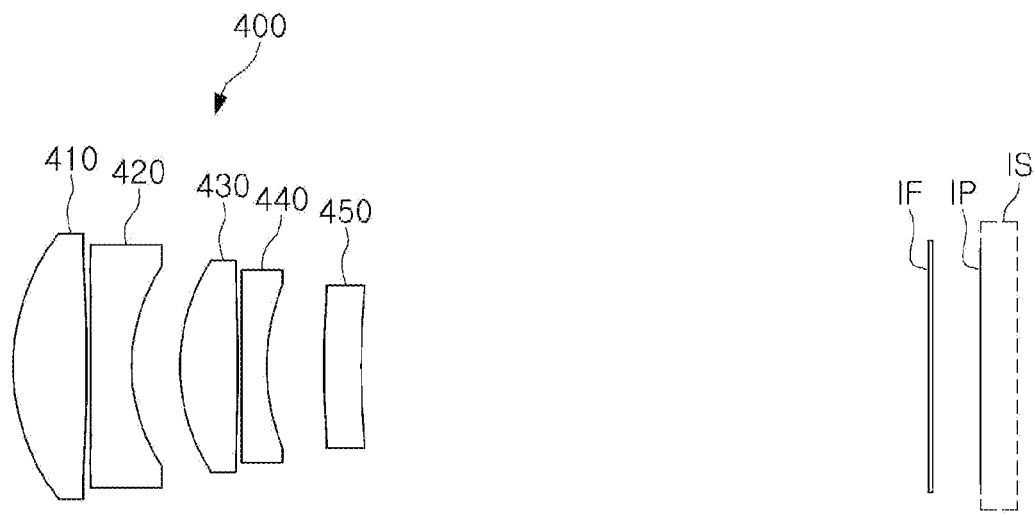
FIG. 9 is a view illustrating an optical imaging system according to a fourth example embodiment in the present disclosure.

An optical imaging system according to a fourth example embodiment will be described with reference to FIG. 9.

An optical imaging system 400 may include a first lens 410, a second lens 420, a third lens 430, a fourth lens 440, and a fifth lens 450.

The first lens 410 may have positive refractive power. An object-side surface of the first lens 410 may be convex, and an image-side surface thereof may be convex. The second lens 420 may have negative refractive power. An object-side surface of the second lens 420 may be concave, and an image-side surface thereof may be concave. The third lens 430 may have positive refractive power. An object-side surface of the third lens 430 may be convex, and an image-side surface thereof may be convex. The fourth lens 440 may have negative refractive power. An object-side surface of the fourth lens 440 may be concave, and an image-side surface thereof may be concave. The fifth lens 450 may have positive refractive power. An object-side surface of the fifth lens 450 may be convex, and an image-side surface thereof may be concave. Among the aforementioned lenses, the fourth lens 440 may be a non-rotational symmetric anamorphic lens.

The optical imaging system 400 may include a filter IF and an imaging plane IP. The filter IF may be disposed in front of the imaging plane IP to block infrared rays or the like included in the incident light. The imaging plane IP may be formed on an image sensor IS. For example, the imaging plane IP may be formed on one surface of the image sensor IS. However, the imaging plane IP is not necessarily formed on the image sensor IS. For example, the imaging plane IP may be formed on any type of member or device capable of converging optical signals, such as an image film.

The optical imaging system 400 may further include a prism (not shown) which is an optical path folding element. The prism may be disposed on an object side of the first lens 410.

The optical imaging system 400 may include a lens having a shape illustrated in FIG. 1. For example, one or more of the first to fifth lenses 410 to 450 may have cut surfaces CS formed on both sides as illustrated in FIG. 1.

Figure 10:
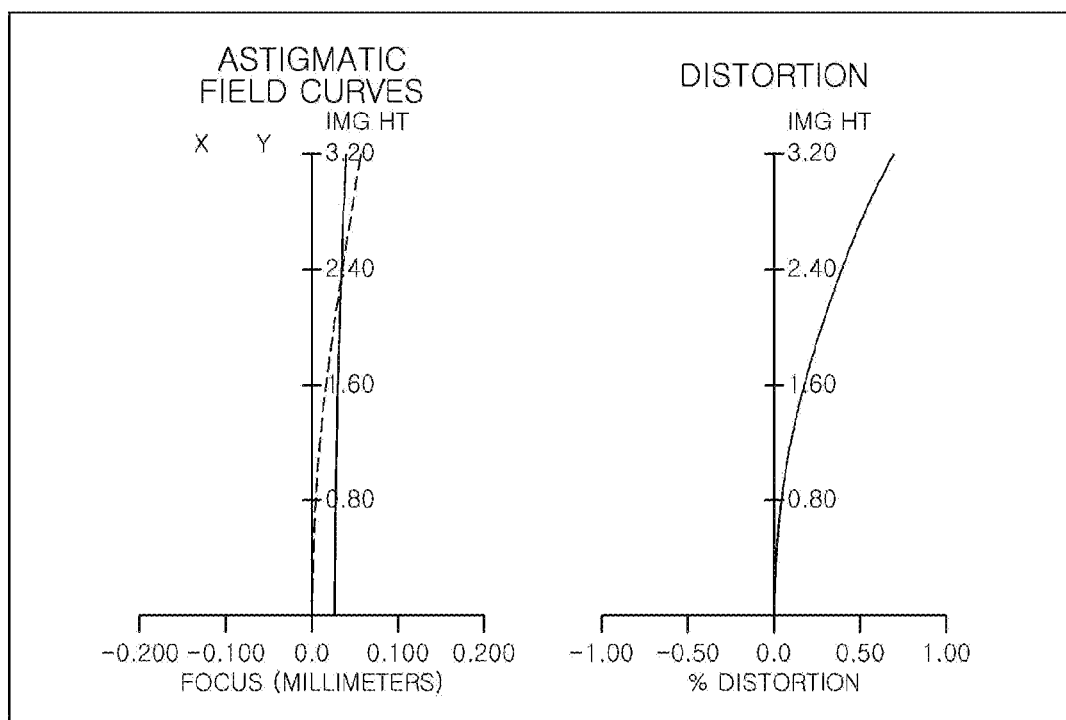
FIG. 10 presents graphs having curves representing aberration characteristics of the optical imaging system illustrated in FIG. 9.

Table 7 represents characteristics of lenses of the optical imaging system 400 according to the present example embodiment, and Table 8 represents aspherical values of the optical imaging system 400 according to the present example embodiment. FIG. 10 presents graphs having curves representing aberration characteristics of the optical imaging system 400 configured as described above.

TABLE 7

| Surface No. | Element | Radius of Curvature (Rx) | Radius of Curvature (Ry) | Thickness/Distance | Refractive Index | Abbe Number | Effective Radius |
|---|---|---|---|---|---|---|---|
| 1 | Prism | Infinity | Infinity | 0.000 | | | 6.000 |
| 2 | | Infinity | Infinity | 5.500 | 1.723 | 29.5 | 6.000 |
| 3 | | Infinity | Infinity | 5.500 | 1.723 | 29.5 | 8.485 |
| 4 | | Infinity | Infinity | 3.000 | | | 6.000 |
| 5 | First Lens | 5.8278 | 5.8278 | 1.995 | 1.537 | 55.7 | |
| 6 | | −48.3702 | −48.3702 | 0.105 | | | |
| 7 | Second Lens | −376.5099 | −376.5099 | 1.117 | 1.644 | 23.5 | |
| 8 | | 4.9818 | 4.9818 | 1.276 | | | |
| 9 | Third Lens | 5.3742 | 5.3742 | 1.604 | 1.667 | 20.4 | |
| 10 | | −35.8594 | −35.8594 | 0.100 | | | |
| 11 | Fourth Lens | −100.0000 | −99.0000 | 0.659 | 1.644 | 23.5 | |
| 12 | | 5.7500 | 5.7500 | 1.557 | | | |
| 13 | Fifth Lens | 15.7621 | 15.7621 | 1.015 | 1.546 | 56.0 | |
| 14 | | 17.1484 | 17.1484 | 15.391 | | | |
| 15 | Filter | Infinity | Infinity | 0.110 | 1.519 | 64.2 | |
| 16 | | Infinity | Infinity | 1.309 | | | |
| 17 | Imaging Plane | Infinity | Infinity | 0.018 | | | |

TABLE 8

| | Surface No. | | | | | 11 : Anamorphic | |
|---|---|---|---|---|---|---|---|
| | 5 | 6 | 7 | 8 | 9 | | |
| K | −0.44799 | −8.69413 | −99.00000 | 0.15145 | 0.37194 | Y Conic Constant | 0.00000 |
| A | 0.00015 | 0.00011 | −0.00019 | −0.00054 | −0.00040 | 4-th Order Symmetry Coefficient | 0.00000 |
| B | 0.00001 | 0.00000 | 0.00001 | 0.00000 | 0.00001 | 6-th Order Symmetry Coefficient | 0.00000 |
| C | 0.00000 | 0.00000 | 0.00000 | 0.00000 | 0.00000 | 8-th Order Symmetry Coefficient | 0.00000 |
| D | 0.00000 | 0.00000 | 0.00000 | 0.00000 | 0.00000 | 10-th Order Symmetry Coefficient | 0.00000 |

TABLE 8-continued

| | | | | | | | |
|---|---|---|---|---|---|---|---|
| E | 0.00000 | 0.00000 | 0.00000 | 0.00000 | 0.00000 | X Conic Constant | −66.28410 |
| F | 0.00000 | 0.00000 | 0.00000 | 0.00000 | 0.00000 | 4-th Order Asymmetry Coefficient | 1.10349 |
| G | 0.00000 | 0.00000 | 0.00000 | 0.00000 | 0.00000 | 6-th Order Asymmetry Coefficient | 1.01404 |
| H | 0.00000 | 0.00000 | 0.00000 | 0.00000 | 0.00000 | 8-th Order Asymmetry Coefficient | 0.34328 |
| J | 0.00000 | 0.00000 | 0.00000 | 0.00000 | 0.00000 | 10-th Order Asymmetry Coefficient | −0.18715 |

| | Surface No. | | | |
|---|---|---|---|---|
| | 10 | 12 | 13 | 14 |
| K | −62.53574 | 0.43065 | −7.45079 | −24.71436 |
| A | 0.00001 | −0.00060 | −0.00158 | −0.00045 |
| B | 0.00007 | 0.00002 | −0.00002 | −0.00007 |
| C | 0.00000 | 0.00000 | −0.00001 | −0.00002 |
| D | 0.00000 | 0.00000 | 0.00000 | 0.00000 |
| E | 0.00000 | 0.00000 | 0.00000 | 0.00000 |
| F | 0.00000 | 0.00000 | 0.00000 | 0.00000 |
| G | 0.00000 | 0.00000 | 0.00000 | 0.00000 |
| H | 0.00000 | 0.00000 | 0.00000 | 0.00000 |
| J | 0.00000 | 0.00000 | 0.00000 | 0.00000 |

Figure 11:
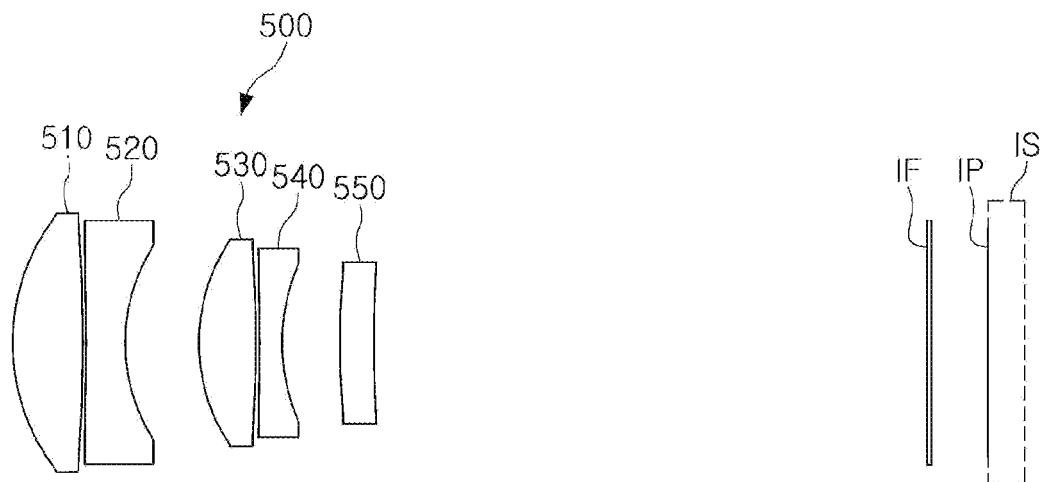
FIG. 11 is a view illustrating an optical imaging system according to a fifth example embodiment in the present disclosure.

An optical imaging system according to a fifth example embodiment will be described with reference to FIG. 11.

An optical imaging system 500 may include a first lens 510, a second lens 520, a third lens 530, a fourth lens 540, and a fifth lens 550.

The first lens 510 may have positive refractive power. An object-side surface of the first lens 510 may be convex, and an image-side surface thereof may be convex. The second lens 520 may have negative refractive power. An object-side surface of the second lens 520 may be concave, and an image-side surface thereof may be concave. The third lens 530 may have positive refractive power. An object-side surface of the third lens 530 may be convex, and an image-side surface thereof may be convex. The fourth lens 540 may have negative refractive power. An object-side surface of the fourth lens 540 may be concave, and an image-side surface thereof may be concave. The fifth lens 550 may have positive refractive power. An object-side surface of the fifth lens 550 may be convex, and an image-side surface thereof may be concave. Among the aforementioned lenses, the second lens 520 and the fourth lens 540 may be non-rotational symmetric anamorphic lenses. The second lens 520 and the fourth lens 540 may be configured as anamorphic lenses having different characteristics. The second lens 520 may have a shape in which a radius of curvature in a first direction of an object-side surface is greater than a radius of curvature in a second direction of the object-side surface, but the fourth lens 540 may have a shape in which a radius of curvature in the first direction of an object-side surface is smaller than a radius of curvature in the second direction of the object-side surface.

The optical imaging system 500 may include a filter IF and an imaging plane IP. The filter IF may be disposed in front of the imaging plane IP to block infrared rays or the like included in the incident light. The imaging plane IP may be formed on an image sensor IS. For example, the imaging plane IP may be formed on one surface of the image sensor IS. However, the imaging plane IP is not necessarily formed on the image sensor IS. For example, the imaging plane IP may be formed on any type of member or device capable of converging optical signals, such as an image film.

The optical imaging system 500 may further include a prism (not shown) which is an optical path folding element. The prism may be disposed on an object side of the first lens 510.

The optical imaging system 500 may include a lens having a shape illustrated in FIG. 1. For example, one or more of the first to fifth lenses 510 to 550 may have cut surfaces CS formed on both sides as illustrated in FIG. 1.

Figure 12:
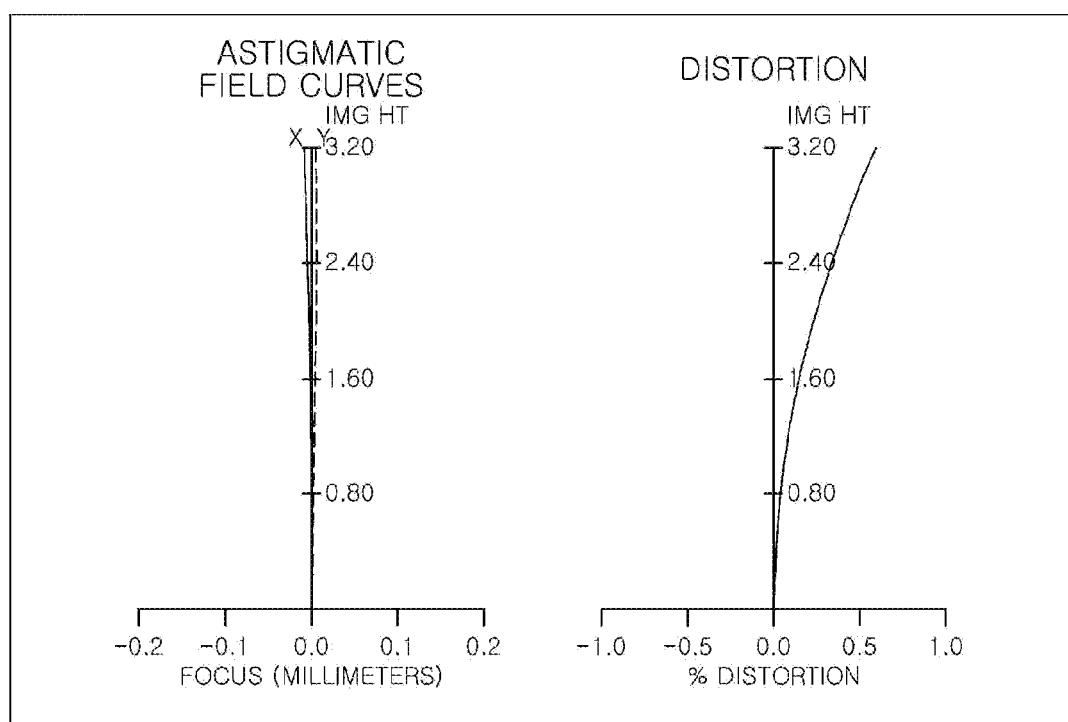
FIG. 12 presents graphs having curves representing aberration characteristics of the optical imaging system illustrated in FIG. 11.

Table 9 represents characteristics of lenses of the optical imaging system 500 according to the present example embodiment, and Table 10 represents aspherical values of the optical imaging system 500 according to the present example embodiment. FIG. 12 presents graphs having curves representing aberration characteristics of the optical imaging system 500 configured as described above.

TABLE 9

| Surface No. | Element | Radius of Curvature (Rx) | Radius of Curvature (Ry) | Thickness/ Distance | Refractive Index | Abbe Number | Effective Radius |
|---|---|---|---|---|---|---|---|
| 1 | Prism | Infinity | Infinity | 0.000 | | | 6.000 |
| 2 | | Infinity | Infinity | 5.500 | 1.723 | 29.5 | 6.000 |
| 3 | | Infinity | Infinity | 5.500 | 1.723 | 29.5 | 8.485 |
| 4 | | Infinity | Infinity | 3.000 | | | 6.000 |
| 5 | First Lens | 5.8278 | 5.8278 | 1.956 | 1.537 | 55.7 | 3.300 |

TABLE 9-continued

| Surface No. | Element | Radius of Curvature (Rx) | Radius of Curvature (Ry) | Thickness/ Distance | Refractive Index | Abbe Number | Effective Radius |
|---|---|---|---|---|---|---|---|
| 6 | | −48.1696 | −48.1696 | 0.100 | | | 3.206 |
| 7 | Second Lens | −354.6721 | −362.7748 | 1.086 | 1.644 | 23.5 | 3.116 |
| 8 | | 4.9949 | 4.9949 | 2.043 | | | 2.614 |
| 9 | Third Lens | 5.4072 | 5.4072 | 1.596 | 1.667 | 20.4 | 2.643 |
| 10 | | −35.1965 | −35.1965 | 0.100 | | | 2.469 |
| 11 | Fourth Lens | −99.9316 | −98.9947 | 0.639 | 1.644 | 23.5 | 2.415 |
| 12 | | 5.7307 | 5.7307 | 1.587 | | | 2.173 |
| 13 | Fifth Lens | 15.3055 | 15.3055 | 0.949 | 1.546 | 56.0 | 2.057 |
| 14 | | 17.6665 | 17.6665 | 15.391 | | | 1.940 |
| 15 | Filter | Infinity | Infinity | 0.110 | 1.519 | 64.2 | 3.092 |
| 16 | | Infinity | Infinity | 1.578 | | | 3.097 |
| 17 | Imaging Plane | Infinity | Infinity | 0.004 | | | 3.214 |

TABLE 10

| | Surface No. | | | | | |
|---|---|---|---|---|---|---|
| | 5 | 6 | 8 | 9 | 10 | 12 |
| K | −0.44815 | −7.79525 | 0.15084 | 0.37275 | −61.93721 | 0.41925 |
| A | 0.00015 | 0.00011 | −0.00054 | −0.00040 | 0.00001 | −0.00061 |
| B | 0.00001 | 0.00000 | 0.00000 | 0.00001 | 0.00007 | 0.00001 |
| C | 0.00000 | 0.00000 | 0.00000 | 0.00000 | 0.00000 | 0.00000 |
| D | 0.00000 | 0.00000 | 0.00000 | 0.00000 | 0.00000 | 0.00000 |
| E | 0.00000 | 0.00000 | 0.00000 | 0.00000 | 0.00000 | 0.00000 |
| F | 0.00000 | 0.00000 | 0.00000 | 0.00000 | 0.00000 | 0.00000 |
| G | 0.00000 | 0.00000 | 0.00000 | 0.00000 | 0.00000 | 0.00000 |
| H | 0.00000 | 0.00000 | 0.00000 | 0.00000 | 0.00000 | 0.00000 |
| J | 0.00000 | 0.00000 | 0.00000 | 0.00000 | 0.00000 | 0.00000 |

| | Surface No. | | | Surface No. | |
|---|---|---|---|---|---|
| | 13 | 14 | | 7 | 11 |
| K | −6.37862 | −25.62393 | Y Conic Constant | 0.00000 | 0.00000 |
| A | −0.00155 | −0.00046 | 4-th Order Symmetry Coefficient | −0.00020 | 0.00000 |
| B | −0.00002 | −0.00007 | 6-th Order Symmetry Coefficient | 0.00001 | 0.00000 |
| C | −0.00001 | −0.00002 | 8-th Order Symmetry Coefficient | 0.00000 | 0.00000 |
| D | 0.00000 | 0.00000 | 10-th Order Symmetry Coefficient | 0.00000 | 0.00000 |
| E | 0.00000 | 0.00000 | X Conic Constant | 0.00000 | −24.84397 |
| F | 0.00000 | 0.00000 | 4-th Order Asymmetry Coefficient | −0.00175 | −1.96708 |
| G | 0.00000 | 0.00000 | 6-th Order Asymmetry Coefficient | −0.00112 | 0.46646 |
| H | 0.00000 | 0.00000 | 8-th Order Asymmetry Coefficient | 0.00254 | 0.09334 |
| J | 0.00000 | 0.00000 | 10-th Order Asymmetry Coefficient | −0.00063912 | −0.26578 |

Figure 13:
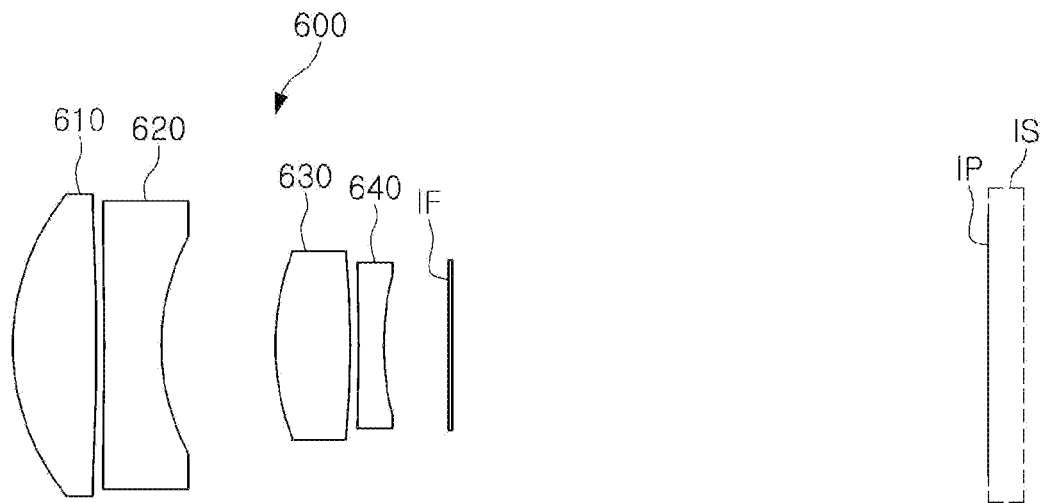
FIG. 13 is a view illustrating an optical imaging system according to a sixth example embodiment in the present disclosure.

An optical imaging system according to a sixth example embodiment will be described with reference to FIG. 13.

An optical imaging system 600 may include a first lens 610, a second lens 620, a third lens 630, and a fourth lens 640.

The first lens 610 may have positive refractive power. An object-side surface of the first lens 610 may be convex, and an image-side surface thereof may be convex. The second lens 620 may have negative refractive power. An object-side surface of the second lens 620 may be concave, and an image-side surface thereof may be concave. The third lens 630 may have positive refractive power. An object-side surface of the third lens 630 may be convex, and an image-side surface thereof may be concave. The fourth lens 640 may have negative refractive power. An object-side surface of the fourth lens 640 may be concave, and an image-side surface thereof may be concave. Among the aforementioned lenses, the second lens 620 and the fourth lens 640 may be non-rotational symmetric anamorphic lenses. The second lens 620 and the fourth lens 640 may be configured as anamorphic lenses having different characteristics. For example, the second lens 620 may have a shape in which a radius of curvature in a first direction of an object-side surface is greater than a radius of curvature in a second direction of the object-side surface, but the fourth lens 640 may have a shape in which a radius of curvature in the first direction of an object-side surface is smaller than a radius of curvature in the second direction of the object-side surface.

The optical imaging system 600 may include a filter IF and an imaging plane IP. The filter IF may be disposed in front of the imaging plane IP to block infrared rays or the like included in the incident light. The imaging plane IP may be formed on an image sensor IS. For example, the imaging plane IP may be formed on one surface of the image sensor IS. However, the imaging plane IP is not necessarily formed on the image sensor IS. For example, the imaging plane IP may be formed on any type of member or device capable of converging optical signals, such as an image film.

The optical imaging system 600 may further include a prism (not shown) which is an optical path folding element. The prism may be disposed on an object side of the first lens 610.

The optical imaging system 600 may include a lens having a shape illustrated in FIG. 1. For example, one or more of the first to fourth lenses 610 to 640 may have cut surfaces CS formed on both sides as illustrated in FIG. 1.

Figure 14:
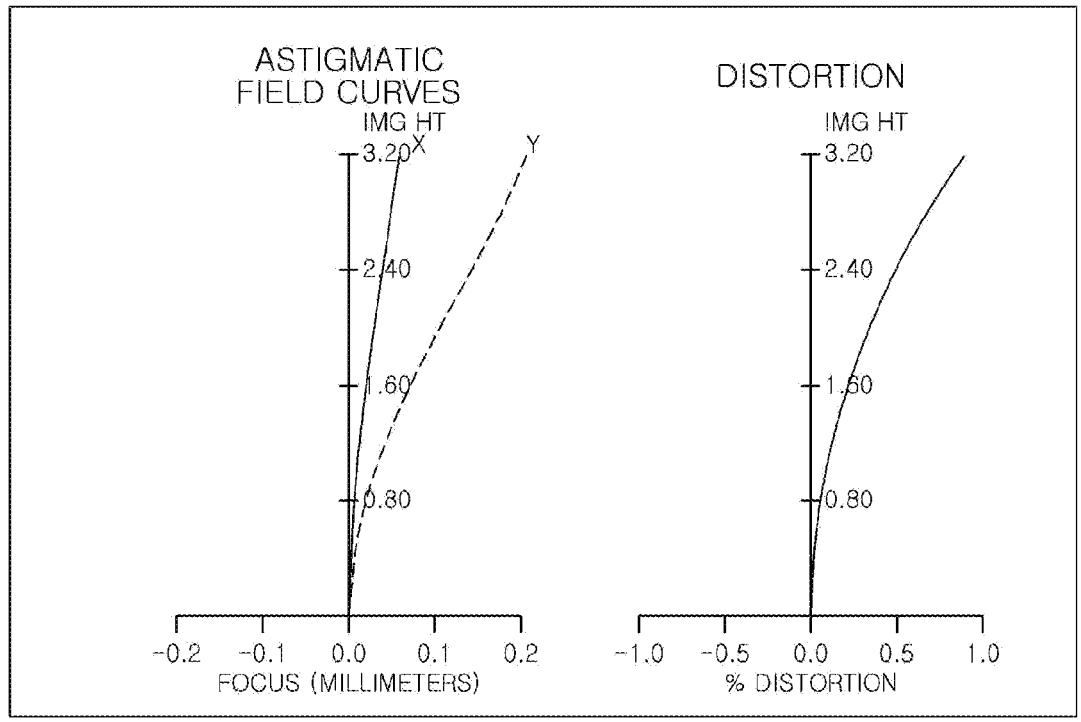
FIG. 14 presents graphs having curves representing aberration characteristics of the optical imaging system illustrated in FIG. 13.

Table 11 represents characteristics of lenses of the optical imaging system 600 according to the present example embodiment, and Table 12 represents aspherical values of the optical imaging system 600 according to the present example embodiment. FIG. 14 presents graphs having curves representing aberration characteristics of the optical imaging system 600 configured as described above.

TABLE 11

| Surface No. | Element | Radius of Curvature (Rx) | Radius of Curvature (Ry) | Thickness/ Distance | Refractive Index | Abbe Number | Effective Radius |
|---|---|---|---|---|---|---|---|
| 1 | Prism | Infinity | Infinity | 0.000 | | | 6.000 |
| 2 | | Infinity | Infinity | 5.500 | 1.723 | 29.5 | 6.000 |
| 3 | | Infinity | Infinity | 5.500 | 1.723 | 29.5 | 8.485 |
| 4 | | Infinity | Infinity | 3.000 | | | 6.000 |
| 5 | First Lens | 5.8236 | 5.8236 | 2.039 | 1.537 | 55.7 | 3.300 |
| 6 | | −48.6265 | −48.6265 | 0.193 | | | 3.342 |
| 7 | Second Lens | −410.5616 | −375.9890 | 1.361 | 1.644 | 23.5 | 3.188 |
| 8 | | 5.7102 | 5.7102 | 2.729 | | | 2.545 |
| 9 | Third Lens | 6.2675 | 6.2675 | 1.818 | 1.667 | 20.4 | 2.098 |
| 10 | | −34.1445 | −34.1445 | 0.202 | | | 1.891 |
| 11 | Fourth Lens | −94.9207 | −98.9855 | 0.606 | 1.644 | 23.5 | 1.841 |
| 12 | | 6.2367 | 6.2367 | 1.587 | | | 1.632 |
| 13 | Filter | Infinity | Infinity | 0.110 | 1.519 | 64.2 | 1.873 |
| 14 | | Infinity | Infinity | 12.889 | | | 1.879 |
| 15 | Imaging Plane | Infinity | Infinity | 0.000 | | | 3.204 |

TABLE 12

| | Surface No. | | | | | |
|---|---|---|---|---|---|---|
| | 5 | 6 | 8 | 9 | 10 | 12 |
| K | −0.46384 | −18.04159 | 0.16700 | 0.35972 | −82.80944 | 0.58062 |
| A | 0.00014 | 0.00012 | −0.00051 | −0.00043 | 0.00004 | −0.00048 |
| B | 0.00000 | 0.00000 | 0.00000 | 0.00001 | 0.00007 | 0.00004 |
| C | 0.00000 | 0.00000 | 0.00000 | 0.00000 | 0.00000 | 0.00000 |
| D | 0.00000 | 0.00000 | 0.00000 | 0.00000 | 0.00000 | 0.00000 |
| E | 0.00000 | 0.00000 | 0.00000 | 0.00000 | 0.00000 | 0.00000 |
| F | 0.00000 | 0.00000 | 0.00000 | 0.00000 | 0.00000 | 0.00000 |
| G | 0.00000 | 0.00000 | 0.00000 | 0.00000 | 0.00000 | 0.00000 |
| H | 0.00000 | 0.00000 | 0.00000 | 0.00000 | 0.00000 | 0.00000 |
| J | 0.00000 | 0.00000 | 0.00000 | 0.00000 | 0.00000 | 0.00000 |

| | Surface No. | |
|---|---|---|
| | 7 | 11 |
| Y Conic Constant | 0.00000 | 0.00000 |
| 4-th Order Symmetry Coefficient | −0.00020 | 0.00000 |
| 6-th Order Symmetry Coefficient | 0.00001 | 0.00000 |
| 8-th Order Symmetry Coefficient | 0.00000 | 0.00000 |
| 10-th Order Symmetry Coefficient | 0.00000 | 0.00000 |
| X Conic Constant | 0.00000 | 92.60156 |
| 4-th Order Asymmetry Coefficient | 0.00289 | −4.22709 |

TABLE 12-continued

| | | |
|---|---|---|
| 6-th Order Asymmetry Coefficient | −0.00252 | −2.05965 |
| 8-th Order Asymmetry Coefficient | −0.00108 | 0.93156 |
| 10-th Order Asymmetry Coefficient | 0.04058 | 0.59775 |

Table 13 represents optical characteristics of the optical imaging systems according to the first to sixth example embodiments.

TABLE 13

| Remark | First Example Embodiment | Second Example Embodiment | Third Example Embodiment | Fourth Example Embodiment | Fifth Example Embodiment | Sixth Example Embodiment |
|---|---|---|---|---|---|---|
| f1 | 10.122 | 7.193 | 18.856 | 9.809 | 9.803 | 9.811 |
| f2x | −7.893 | −6.577 | −12.360 | −7.608 | −7.624 | −8.701 |
| f2y | — | — | — | — | −7.621 | −8.713 |
| f3x | 7.178 | 12.572 | 14.843 | 7.104 | 7.125 | 8.069 |
| f3y | — | — | 14.867 | — | — | — |
| f4x | −8.409 | −12.613 | — | −8.397 | −8.371 | −9.068 |
| f4y | −8.417 | −12.538 | — | −8.402 | −8.376 | −9.044 |
| f5 | 328.967 | 27.720 | — | 283.527 | 183.552 | — |
| TTL | 27.002 | 18.397 | 24.658 | 26.255 | 27.139 | 23.534 |
| BFL | 18.002 | 9.897 | 19.982 | 16.828 | 17.083 | 14.586 |
| f | 30.900 | 19.000 | 23.667 | 29.127 | 28.967 | 25.025 |
| f number | 4.460 | 3.520 | 3.940 | 4.410 | 4.410 | 4.400 |
| HFOV | 11.870 | 24.730 | 12.470 | 12.440 | 12.440 | 14.450 |
| IMG HT | 3.200 | 4.200 | 2.590 | 3.200 | 3.200 | 3.200 |

In Table 13, TTL is a distance from an object-side surface of the first lens to the imaging plane, BFL is a distance from an image-side surface of the lens closest to the imaging plane to the imaging plane, HFOV is a half angle of view, and IMG HT is a height of the imaging plane (a half of a diagonal length of an imaging plane). f1 is a focal length of the first lens, f2x is a focal length of the second lens calculated based on the radius of curvature of the first profile, f2y is a focal length of the second lens calculated based on the radius of curvature of the second profile, f3x is a focal length of the third lens calculated based on the radius of curvature of the first profile, f3y is a focal length of the third lens calculated based on the radius of curvature of the second profile, f4x is a focal length of the fourth lens calculated based on the radius of curvature of the first profile, f4y is a focal length of the fourth lens calculated based on the radius of curvature of the second profile, and f5 is a focal length of the fifth lens.

Tables 14 and 15 represent values of Conditional Expressions of the optical imaging systems according to the first to sixth example embodiments.

TABLE 14

| Conditional Expression | First Example Embodiment (Fourth Lens) | Second Example Embodiment (Fourth Lens) | Third Example Embodiment (Third Lens) | Fourth Example Embodiment (Fourth Lens) | Fifth Example Embodiment (Fourth Lens) | Sixth Example Embodiment (Fourth Lens) |
|---|---|---|---|---|---|---|
| $|(Rx1-Ry1)/Ry1|$ | 0.0174 | 0.0050 | 0.0039 | 0.0101 | 0.0095 | 0.0411 |
| $|fx-fy|$ | 0.0082 | 0.0751 | 0.0241 | 0.0048 | 0.0045 | 0.0238 |
| $|(fx-fy)/fx|$ | 0.0010 | 0.0060 | 0.0016 | 0.0006 | 0.0005 | 0.0026 |
| $(fx-fy)/f$ | 0.0003 | 0.0040 | 0.0010 | 0.0002 | 0.0002 | 0.0010 |
| $(Rx1-Ry1)/Rx2$ | 1.0754 | 0.4883 | 1.7441 | 1.0682 | 1.0674 | 1.0219 |
| $(R10x-R11x)/(R10y-R11y)$ | 1.0287 | 0.9859 | — | 1.0158 | 1.0147 | 0.9373 |

TABLE 15

| Conditional Expression | Fifth Example Embodiment (Second Lens) | Sixth Example Embodiment (Second Lens) |
|---|---|---|
| $|(Rx1 - Ry1)/Ry1|$ | 0.0223 | 0.0920 |
| $|fx - fy|$ | 0.0026 | 0.0120 |
| $|(fx - fy)/fx|$ | 0.0003 | 0.0014 |
| $(fx - fy)/f$ | 0.0001 | 0.0005 |
| $(Rx1 - Ry1)/Rx2$ | 0.9914 | 1.1071 |

As set forth above, according to example embodiments in the present disclosure, the resolution deterioration phenomenon due to the asymmetrical shape may be significantly reduced.

While specific example embodiments have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A lens, wherein
a first profile in a first direction intersecting an optical axis and a second profile in a second direction intersecting the optical axis are different from each other,
a length of the first profile in the first direction is different from a length of the second profile in the second direction,
$0<|(fx-fy)/fx|<0.01$ in which fx is a focal length of the lens calculated based on a radius of curvature of the first profile, and fy is a focal length of the lens calculated based on a radius of curvature of the second profile, and
wherein $0.2<|(Rx1-Ry1)/Rx2|<2.0$ in which Rx1 is a radius of curvature of an object-side surface of the first profile, Ry1 is a radius of curvature of an object-side surface of the second profile, and Rx2 is a radius of curvature of an image-side surface of the first profile.

2. The lens of claim 1, wherein the radius of curvature Rx1 of the object-side surface of the first profile and the radius of curvature Ry1 of the object-side surface of the second profile are different from each other.

3. The lens of claim 1, wherein $0<|(Rx1-Ry1)/Ry1|<0.5$.

4. The lens of claim 1, wherein $0<|fx-fy|<0.5$ mm.

5. An optical imaging system comprising:
three or more lenses disposed on an optical axis,
wherein one or more of the three or more lenses comprises one or more anamorphic lenses each having at least one surface comprising a first profile including the optical axis different from a second profile including the optical axis, and a first length different from a length of the second profile,
wherein $0<|(fx-fy)/fx|<0.01$ in which fx is a focal length of the one or more anamorphic lenses calculated based on a radius of curvature of the first profile, and fy is a focal length of the one or more anamorphic lenses calculated based on a radius of curvature of the second profile, and
wherein $0.2<|(Rx1-Ry1)/Rx2|<2.0$ in which Rx1 is a radius of curvature of an object-side surface of the first profile, Ry1 is a radius of curvature of an object-side surface of the second profile, and Rx2 is a radius of curvature of an image-side surface of the first profile.

6. The optical imaging system of claim 5, wherein:
the three or more lenses comprises a first lens, a second lens, and a third lens disposed in sequential order from an object side, and the third lens is an anamorphic lens of the one or more anamorphic lenses, or
the three or more lenses comprises a first lens, a second lens, a third lens, and a fourth lens disposed in sequential order from an object side, and the second lens and the fourth lens are anamorphic lenses of the one or more anamorphic lenses, or
the three or more lenses comprises a first lens, a second lens, a third lens, a fourth lens, and a fifth lens disposed in sequential order from an object side, and the fourth lens or the second lens and the fourth lens are anamorphic lenses of the one or more anamorphic lenses.

7. The optical imaging system of claim 6, wherein when the second lens and the fourth lens are anamorphic lenses, the first profile and the second profile are on the object-side surfaces of the second lens and the fourth lens, and the first profile of the second lens aligns with the second profile of the fourth lens when viewed in a direction of the optical axis, and
wherein the first profile has a greater radius of curvature than the second profile of the second and fourth lenses.

8. The optical imaging system of claim 5, wherein the first lens has positive refractive power, the second lens has negative refractive power, and the third lens has positive refractive power.

9. An optical imaging system comprising:
an anamorphic lens comprising a radius of curvature Rx1 of an object-side surface of a first profile including an optical axis, and a radius of curvature Ry1 of the object-side surface of a second profile including the optical axis, different from each other,
wherein a length of the first profile and a length of the second profile are different from each other,
wherein $0<|(fx-fy)/fx|<0.01$ in which fx is a focal length of the anamorphic lens calculated based on the radius of curvature of the first profile of the anamorphic lens and fy is a focal length of the anamorphic lens calculated based on the radius of curvature of the second profile of the anamorphic lens, and
wherein $0.2<|(Rx1-Ry1)/Rx2|<2.0$ in which Rx2 is a radius of curvature of an image-side surface of the first profile.

10. The optical imaging system of claim 9, further comprising a first lens, a second lens, and a third lens sequentially arranged from an object side,
wherein the third lens has positive refractive power and is the anamorphic lens.

11. The optical imaging system of claim 9, further comprising a first lens, a second lens, a third lens, and a fourth lens sequentially arranged from an object side,
wherein the second lens and the fourth lens are the anamorphic lens.

12. The optical imaging system of claim 9, further comprising a first lens, a second lens, a third lens, a fourth lens, and a fifth lens sequentially arranged from an object side,
wherein the second lens and the fourth lens are the anamorphic lens.

13. The optical imaging system of claim 9, further comprising a first lens, a second lens, a third lens, a fourth lens, and a fifth lens sequentially arranged from an object side,
wherein the fourth lens is the anamorphic lens.

14. The optical imaging system of claim 13, wherein $0.6<(R10-R11x)/(R10-R11y)<1.2$ in which R10 is a radius of curvature of an image-side surface of the third lens, R11x is a radius of curvature of an object-side surface according to a first profile of the fourth lens, and R11y is a radius of curvature of an object-side surface according to a second profile of the fourth lens.

15. The optical imaging system of claim 9, wherein $0<|(fx-fy)/f|<0.005$ in which f is a focal length of the optical imaging system.

* * * * *